(12) United States Patent
Binek et al.

(10) Patent No.: US 12,529,337 B1
(45) Date of Patent: Jan. 20, 2026

(54) ADDITIVELY MANUFACTURED TURBINE ENGINE CASE WITH FUEL MANIFOLD

(71) Applicant: RTX Corporation, Farmington, CT (US)

(72) Inventors: Lawrence A. Binek, Glastonbury, CT (US); Yoel Bugin, Port St. Lucie, FL (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/950,877

(22) Filed: Nov. 18, 2024

(51) Int. Cl.
*F02C 7/22* (2006.01)
*F23R 3/28* (2006.01)

(52) U.S. Cl.
CPC .............. *F02C 7/222* (2013.01); *F23R 3/286* (2013.01)

(58) Field of Classification Search
CPC .... F02C 7/22; F02C 7/222; F23R 3/28; F23R 3/283; F23R 3/286; F01D 25/14; F01D 25/24; F05D 2230/30
See application file for complete search history.

(56) References Cited

U.S. PATENT DOCUMENTS

| | | | |
|---|---|---|---|
| 11,156,156 B2 * | 10/2021 | Binek | F02C 7/222 |
| 11,359,543 B2 | 6/2022 | Binek et al. | |
| 11,465,247 B2 | 10/2022 | Binek et al. | |
| 11,542,844 B2 | 1/2023 | Binek et al. | |
| 11,555,450 B1 * | 1/2023 | Ryon | F02C 7/141 |
| 11,649,964 B2 | 5/2023 | Binek et al. | |
| 11,808,455 B2 * | 11/2023 | Binek | F23R 3/28 |
| 11,898,493 B2 * | 2/2024 | Ryon | F02C 7/224 |
| 2020/0109668 A1 | 4/2020 | Butcher et al. | |
| 2020/0224876 A1 | 7/2020 | Greenfield et al. | |
| 2020/0398386 A1 * | 12/2020 | Binek | F23R 3/346 |
| 2020/0400314 A1 * | 12/2020 | Binek | F02C 7/16 |
| 2022/0082257 A1 * | 3/2022 | Binek | F23R 3/14 |
| 2022/0170636 A1 * | 6/2022 | Binek | F23R 3/28 |
| 2022/0316400 A1 * | 10/2022 | Binek | F02C 7/232 |
| 2022/0389872 A1 | 12/2022 | Smith et al. | |
| 2023/0053527 A1 * | 2/2023 | Ryon | F02C 7/185 |
| 2023/0057936 A1 * | 2/2023 | Ryon | F02C 7/22 |
| 2023/0160323 A1 * | 5/2023 | Binek | F23R 3/60 415/208.1 |
| 2024/0271568 A1 * | 8/2024 | Binek | F23R 3/283 |

FOREIGN PATENT DOCUMENTS

| | | |
|---|---|---|
| CN | 108590859 A | 9/2018 |
| WO | 2024010565 A1 | 1/2024 |

* cited by examiner

*Primary Examiner* — William H Rodriguez
(74) *Attorney, Agent, or Firm* — Bachman & LaPointe, P.C.

(57) ABSTRACT

A gas turbine engine case structure includes the unitary combination of: a case wall having an inner surface and an outer surface; at least one fuel inlet; circumferentially-distributed fuel injectors protruding inward from the case wall and having an outlet; a fuel plenum fluidically between the at least one fuel inlet and the fuel injectors and configured so that each inlet of the at least one inlet is coupled to feed multiple of the fuel injectors; and a fuel inlet conduit fluidically between the fuel inlet and the fuel plenum. The inlet conduit has a forward inlet and is held spaced from the case wall at multiple longitudinally-spaced locations.

20 Claims, 7 Drawing Sheets

ADDITIVELY MANUFACTURED TURBINE ENGINE CASE WITH FUEL MANIFOLD

BACKGROUND

The disclosure relates to gas turbine engines. More particularly, the disclosure relates to additively manufactured fuel manifolds.

Gas turbine engines (used in propulsion and power applications and broadly inclusive of turbojets, turboprops, turbofans, turboshafts, industrial gas turbines, and the like) may include an integrated additively manufactured fuel manifold that serves to receive fuel through one or more inlet ports and distribute fuel to a plurality of discharge ports. The manifold's discharge ports may, themselves, be fuel nozzles as part of the additively manufactured piece. Alternatively, manifold outlet ports may be bosses or other fittings intended to mate with separate fuel nozzles at or near the point-of-delivery.

SUMMARY

One aspect of the disclosure involves a gas turbine engine case structure comprising the unitary combination of: a case wall having an inner surface and an outer surface; at least one fuel inlet; a circumferentially-distributed plurality of fuel injectors protruding inward from the case wall and each having a fuel delivery outlet; a fuel plenum fluidically between the at least one fuel inlet and the fuel injectors and configured so that each inlet of the at least one inlet is coupled to feed multiple injectors of the plurality of fuel injectors and a fuel inlet conduit fluidically between the fuel inlet and the fuel plenum. The unitary combination further comprises one or more linking structures with gaps and joining the fuel inlet conduit to the case wall.

In a further embodiment of any of the foregoing embodiments, additionally and/or alternatively, the fuel plenum is partial annulus.

In a further embodiment of any of the foregoing embodiments, additionally and/or alternatively, the at least one inlet is at most two inlets.

In a further embodiment of any of the foregoing embodiments, additionally and/or alternatively, the unitary combination further comprises: a pair of walls joining the fuel inlet conduit to the case wall, the linking portions between the pair of walls.

In a further embodiment of any of the foregoing embodiments, additionally and/or alternatively, a volume between the pair of walls has a first opening and a second opening to an external environment and axially spaced from each other.

In a further embodiment of any of the foregoing embodiments, additionally and/or alternatively, the unitary combination further comprises: a mounting flange, the fuel inlet conduit extending from the mounting flange to the fuel plenum.

In a further embodiment of any of the foregoing embodiments, additionally and/or alternatively, for each said fuel injector the case structure comprises: a splash plate having a first face and a second face, the fuel injector outlet facing the second face; and a support connecting the splash plate to the case wall and the fuel injector.

In a further embodiment of any of the foregoing embodiments, additionally and/or alternatively, there are five to nine said fuel injectors or, more particularly, six to eight said fuel injectors.

A further embodiment of any of the foregoing embodiments may additionally and/or alternatively include a gas turbine engine including the gas turbine engine case structure and further comprising: a rotor having a compressor section and a turbine section an air inlet housing mounted to the case structure; and a fuel flowpath passing through the air inlet housing to the at least one fuel inlet. In some embodiments, the engine is a single-spool engine with just a single compressor section and just a single turbine section. In some embodiments, the compressor section may be a centrifugal compressor. In some embodiments, the engine may be a turbojet.

A further embodiment of any of the foregoing embodiments may additionally and/or alternatively include a method for manufacturing the gas turbine engine case structure, the method comprising: additive manufacture with a build direction (590) within 15° of parallel to an axis of the gas turbine engine case structure.

A further embodiment of any of the foregoing embodiments may additionally and/or alternatively include vibrating so that powder passes out from the gaps.

In a further embodiment of any of the foregoing embodiments, additionally and/or alternatively, the additive manufacture is PBF-LB.

A further embodiment of any of the foregoing embodiments may additionally and/or alternatively include a method for using the gas turbine engine case structure, the method comprising: introducing fuel through the inlet; the fuel passing axially through the inlet conduit to the fuel plenum; the fuel passing circumferentially through the fuel plenum to the plurality of fuel injectors and out their outlets; and the fuel mixing with air and combusting.

A further aspect of the disclosure involves a gas turbine engine case structure comprising the unitary combination of: a case wall having an inner surface and an outer surface; a mounting flange; at least one fuel inlet in the mounting flange; a circumferentially-distributed plurality of fuel injectors protruding inward from the case wall and having an outlet; a fuel plenum fluidically between the at least one fuel inlet and the fuel injectors and configured so that each inlet of the at least one inlet is coupled to feed multiple injectors of the plurality of fuel injectors. A fuel inlet conduit fluidically between the fuel inlet and the fuel plenum.

In a further embodiment of any of the foregoing embodiments, additionally and/or alternatively, the fuel inlet conduit is spaced apart from the case wall outer surface.

In a further embodiment of any of the foregoing embodiments, additionally and/or alternatively, the unitary combination comprises a pair of walls joining the fuel inlet conduit to the case wall.

In a further embodiment of any of the foregoing embodiments, additionally and/or alternatively, the fuel plenum is partial annulus.

In a further embodiment of any of the foregoing embodiments, additionally and/or alternatively, the at least one inlet is at most two inlets.

In a further embodiment of any of the foregoing embodiments, additionally and/or alternatively, a single additively manufactured piece forms the case wall, the mounting flange, and the fuel inlet conduit and bounds the fuel plenum.

The features of the embodiments above may be combined in any combination unless expressly indicated otherwise or technically infeasible.

The details of one or more embodiments are set forth in the accompanying drawings and the description below.

Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

As is discussed further below, an example may involve the modification of the configuration of a baseline gas turbine engine to integrate a fuel conduit with a case structure (e.g., additively manufactured as a unit) to generally aftward direct a flow of fuel through such conduit. In some embodiments, the fuel flowpath may flow serially through separate such conduits in a forward inlet member or air inlet housing (AIH) and an aft main case structure. The main case structure may enclose combustor and turbine sections and thus the associated fuel conduit may be provided with means for limiting heat transfer to the fuel. For the inlet member, which is generally exposed to cool inlet air and perhaps to slightly warmed compressor air, such transfer considerations are more limited or negligible.

The main case or static structure may be unitarily additively manufactured as a full annulus or a circumferentially split structure. Thus, in one example discussed, a forward structure forming a forward inlet member/AIH and effectively a compressor case may largely be one single full annulus additively manufactured piece and an aft main case structure forming a diffuser, combustor body, and turbine case may largely be a second single full annulus additively manufactured piece. The two may be joined at a joint such as a bolt circle at mating flanges. Such a main case single piece may be additively manufactured such as via powder bed fusion-laser beam (PBF-LB), selective laser sintering (SLS), or directed energy deposition (DED). Example material is a nickel-based superalloy such as the Inconel family (e.g., Inconel 625). Nevertheless, features discussed below may be applied to split cases and may be applied to axially and/or radially less extensive pieces (e.g., wherein the combustor body (walls) and/or the diffuser are not part of the single piece).

Figure 1:
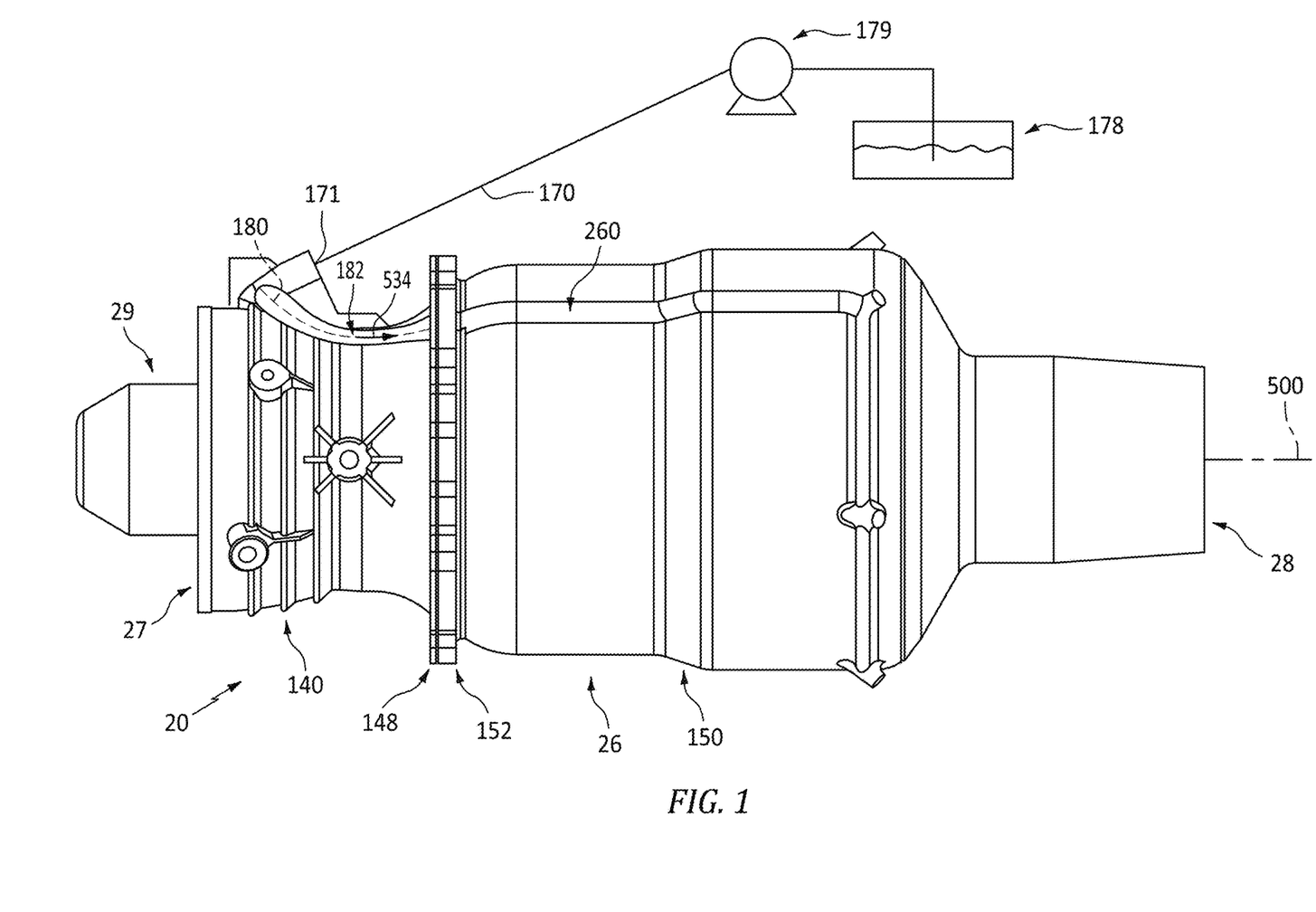
FIG. 1 side view of a gas turbine engine.
Figure 2:
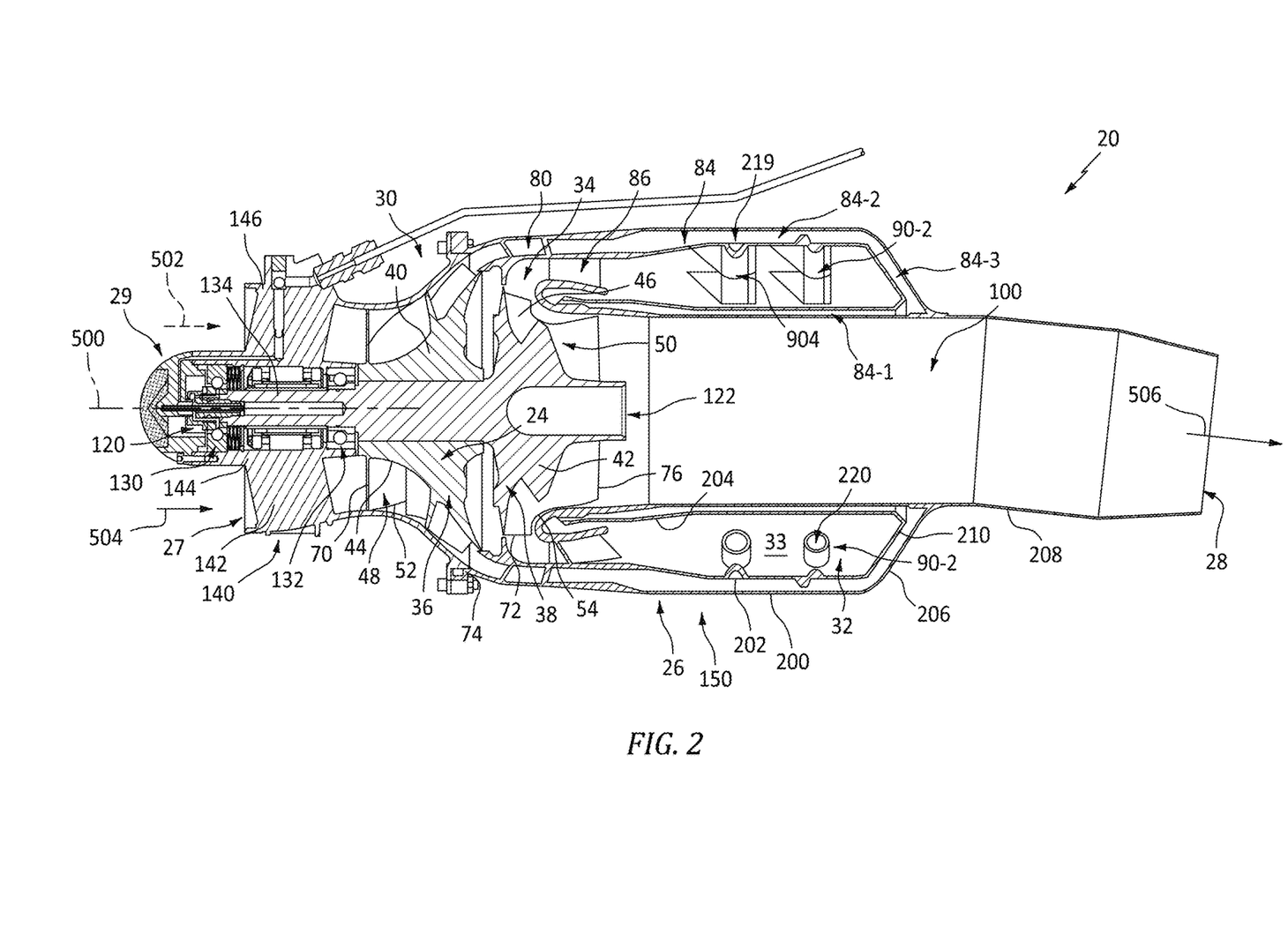
FIG. 2 is a schematic central longitudinal sectional view of the gas turbine engine.

FIGS. 1 and 2 show a gas turbine engine 20. The engine has a core centerline 500 (FIG. 2) which serves as an axis of rotation of one or more spools 24 relative to a case 26. As is discussed further below, the example engine is a single-spool attritable turbine engine, namely a turbojet. The case 26 is formed as an axial assembly of multiple pieces (e.g., castings or additive manufactures). A primary gas flowpath (gaspath) 502 extends from an inlet 27 to an outlet 28. Along the gaspath 502, the inlet gas flow 504 is an air flow and the outlet (exhaust) flow 506 is an exhaust gas flow. At a front or forward end of the engine (e.g., shown surrounded by the inlet 27) is an inlet centerbody 29.

The example gaspath 502 passes sequentially through a compressor section (compressor) 30, a combustor section (combustor) 32, and a turbine section (turbine) 34. The example compressor and turbine sections respectively have a centrifugal impeller 36 and centrifugal turbine 38 of the spool 24. The impeller and turbine have respective hubs 40, 42 (FIG. 2A) having gaspath-facing surfaces 44, 46 and a circumferential array of vanes 48, 50 extending radially outward to edges or tips 52, 54 in close facing relation or rubbing relation to inner diameter (ID) surfaces 60, 62 (FIG. 2A) of non-rotating structure forming shrouds. Along the gaspath 502, the respective vanes 48, 50 extend from leading (upstream) ends 70, 72 to trailing (downstream) ends 74, 76.

The example compressor 30 receives a generally axial air flow 504 (FIG. 2A) along the gaspath 502 and redirects it partially radially outward. Upon exiting the impeller 36 at the vane downstream ends 74, the compressed air flow is redirected more axially rearward in a diffuser 80. The diffuser 80 comprises an inlet vane ring 82 (FIG. 3) leading to a diffuser plenum 84. The diffuser plenum has inner diameter (ID), outer diameter (OD), and aft/turn sections 84-1, 84-2, and 84-3. Exiting the diffuser, the air flow enters the combustor 32 interior/combustion chamber 33. The example air flows from the OD diffuser plenum section 84-2 via fore and aft circumferential arrays of dilution chutes/flow tubes 90-1 and 90-2, respectively. As is discussed below, fuel injectors introduce fuel via a sub-group of the aft dilution chutes/flow tubes 90-2. A portion of the air from the diffuser OD section 84-2, in turn, passes radially inward through the aft/turn section 84-3 and then passes forward through the ID section 84-1 to, in turn, mix with the combustion gases at the inlet to the exit vane array 86. The example combustor 32 is a reverse flow annular combustor wherein the air is combusted with fuel and diverted back forward to enter the turbine 38 via the exit vane array 86 and passing radially inward at the turbine vane upstream ends 72. Passing along the turbine 38, the combustion gases are expanded and redirected axially rearward to pass into an exhaust duct 100 (FIG. 2) and out the outlet 28 as the outlet or exhaust flow 506.

The example spool 24 (FIG. 2A) extends from a front or forward end 120 to a rear or aft end 122. The impeller 36 and turbine 38 are rearwardly cantilevered with the spool 24 supported by a pair of bearings 130, 132 along a forward portion of a spool shaft 134. The example spool shaft 134 is unitarily formed with the turbine 38 with an intermediate portion of the spool shaft received in a bore of the impeller 36 (e.g., via splined or otherwise rotationally keyed inter-fitting).

Figure 2A:
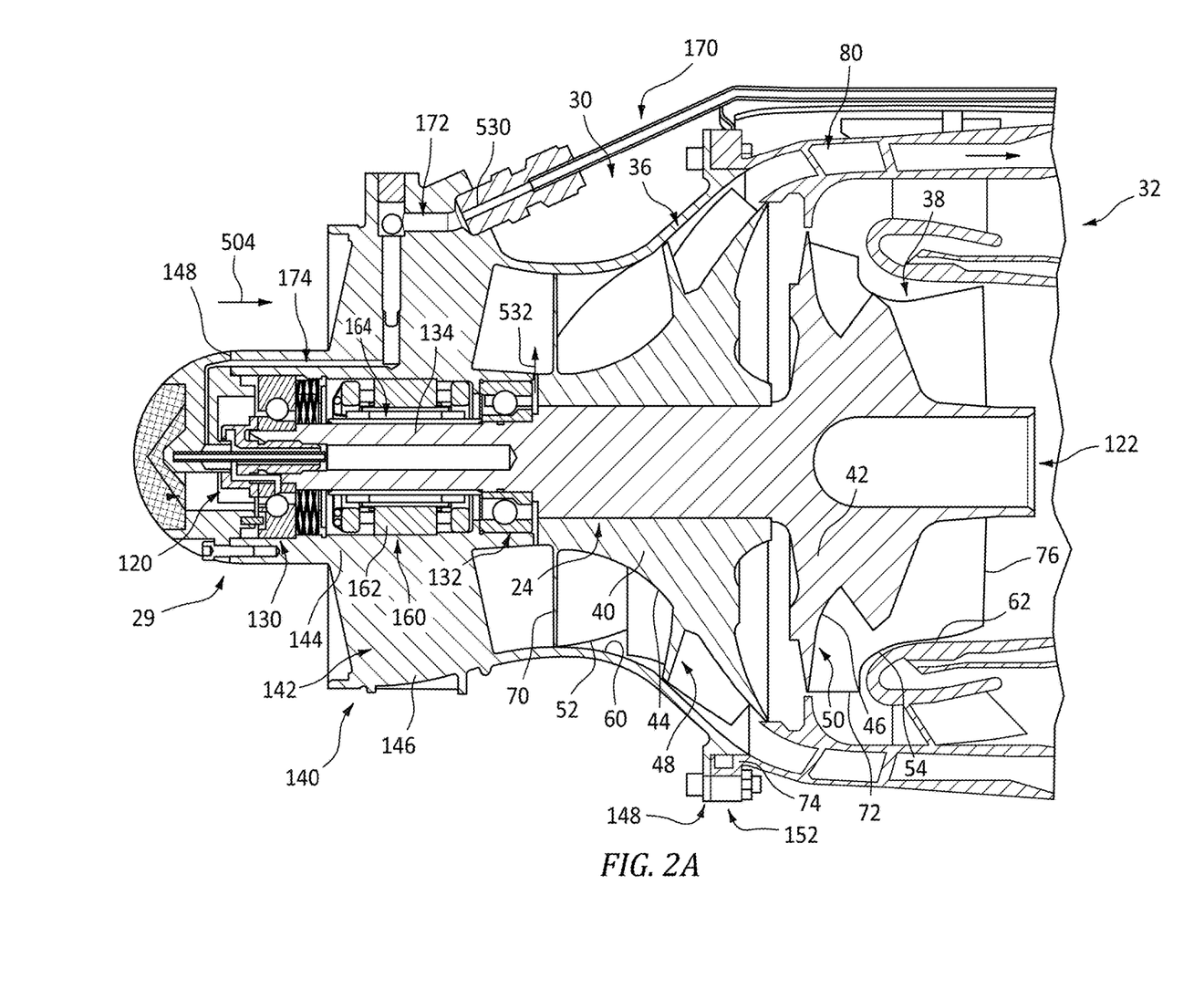
FIG. 2A is an enlarged view of a forward portion of the engine of FIG. 2.

The example bearings 130 and 132 have ball bearing arrays with respective inner races on the spool shaft 134 and outer races mounted to the case 26. At the inlet 27, the case 26 includes an inlet member or air inlet housing (AIH, e.g., a casting or additive manufacture) 140 having a circumferential array of vanes 142 extending radially from an inner diameter hub 144 to an outer diameter (OD) case portion 146. The example hub 144 forms a portion of the outer diameter contour of the centerbody 29 and mounts the outer races of bearings 130 and 132. As discussed further below, the inlet member (AIH) 140 mounts to a main case or combustor case structure 150 (e.g. at a respective mated aft flange 148 and forward flange 152). The flanges may be secured to each other by a bolt circle or other threaded fasteners. An alternative connection may use a v-band instead of threaded fasteners.

FIG. 2A further shows a generator 160 including a stator 162 mounted to the inlet member 140 and a rotor 164 mounted to the spool shaft 134. Conventional electrical connections and the like are not shown. FIG. 2A further shows a fuel inlet line or conduit 170 (e.g., pipe) delivering a fuel flow 530 along a fuel flowpath from a fuel source (e.g., tank 178 (FIG. 1) and pump 179) to a plenum 172 (FIG. 2A) in the inlet member 140. The example inlet member 140 has a fuel inlet 171 (inlet port) to which the fuel inlet conduit connects such as via an appropriate fitting. The plenum 172 has one or more branches or passageways 174 for feeding one or more branch flows (or subbranches) 532 (FIG. 2A) to the bearings (e.g., further branching into flows respectively to the forward bearing 130 and the aft bearing 132 and then rejoining and flowing into the gaspath at the compressor inlet).

In addition to one or more fuel passageways branching ultimately from the inlet 171 to the bearings, one or more passageways 180 (FIG. 1) branch within the inlet member 140 to ultimately pass fuel 534 to the combustor. The example passageway 180 is in a conduit 182 integral with a main piece (e.g. additively manufactured) of the inlet member 140 (e.g., forming an outer diameter (OD) blister thereof) extending aft to mate with a main case structure 150 fuel conduit/passageway.

For use in a such a reverse flow combustor gas turbine engine, FIG. 2 shows such a main case structure 150 including as a single additively manufactured piece the forward flange 152, the diffuser 80, the exit vane array 86 (combustor exit nozzle or turbine inlet vane ring) combustor wall structure, and diffuser wall structure. The example single piece further includes at least a major portion of the exhaust duct wall (e.g., to which a separate exhaust nozzle is mated). The example single piece also includes the aforementioned dilution chutes and at least major portions of the injectors. It further includes a fuel inlet conduit 260 (e.g., fuel delivery tube) as discussed above and further below mated to the inlet member fuel conduit 182 (illustrated in FIG. 1).

In the FIG. 2 example, the main case 150 includes an outer wall 200 extending aft from the flange 152 and bounding the diffuser plenum outer diameter (OD) section 84-2 at the outer diameter (OD). Radially inboard of the outer wall 200 is a combustor OD wall/diffuser ID wall 202. These walls 200 and 202 extend aft from the exit vane array 86 with the wall 202 forming the ID/platform of such vane array. Additionally, the main case structure 150 includes an inner diameter (ID) combustor wall 204. This wall 204 generally forms an OD boundary of the diffuser plenum inner diameter (ID) section 84-1.

A diffuser bulkhead wall section 206 generally forms an aft boundary of the diffuser plenum aft/turn section 84-3 and merges with the exhaust duct wall 208. Similarly, a combustor bulkhead wall 210 generally forms an aft boundary of the combustor and forward boundary of the diffuser plenum aft/turn section 84-3 and joins the wall sections 202 and 204.

In operation, the compressed airflow from the compressor passes through the diffuser 80 into the diffuser plenum OD section 84-2 and passes aft therethrough. As noted above, from this section 84-2 air passes into the combustor via the chutes 90-1 and 90-2 mixing with fuel as discussed further below.

The airflow continues through the aft/turn section 84-3 turning back forward through the ID section 84-1 and ultimately back to join combustion gases near the inlet to the exit vane array 86.

Figure 3:
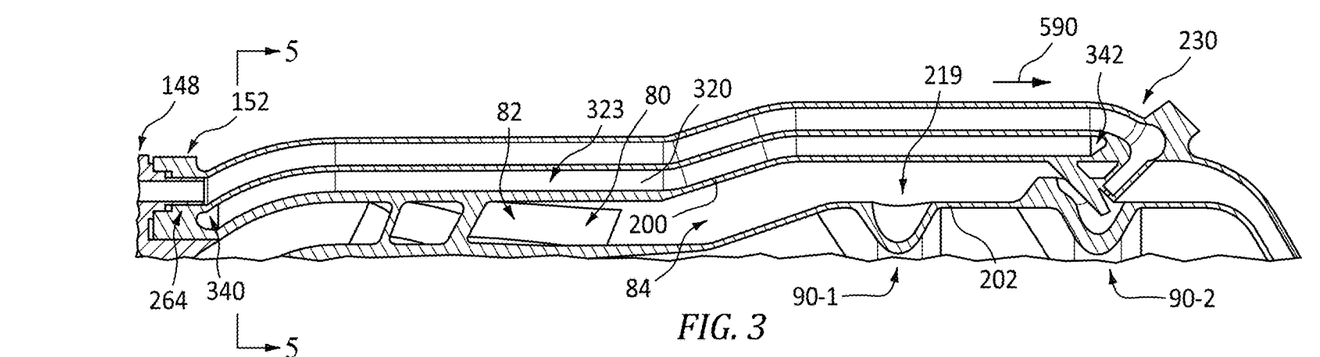
FIG. 3 is an enlarged view of a fueling portion of the engine.

FIG. 3 shows the forward circumferential array of dilution chutes/flow tubes 90-1 and the aft circumferential array of dilution chutes/flow tubes 90-2. The dilution chutes have outer diameter inlets 219 along the wall 202 which forms an inner diameter wall of the diffuser plenum 84 and an outer diameter wall of the combustor combustion chamber 33 and inner diameter outlets 220 in the combustion chamber/combustor interior 33. Given the reverse flow nature, the forward array inlets are upstream of the aft array inlets and the forward array outlets are downstream of the aft array outlets. The dilution chutes introduce air from the diffuser plenum OD section 84-2 into the combustion chamber 33 to provide a tangential swirl component to that airflow in the combustion chamber 33.

The example forward array dilution chutes all exclusively introduce air. The aft array dilution chutes are divided into two groups alternating with each other. One group introduces only air and the other group is associated with fuel injectors to inject fuel into their introduced air.

Figure 3A:
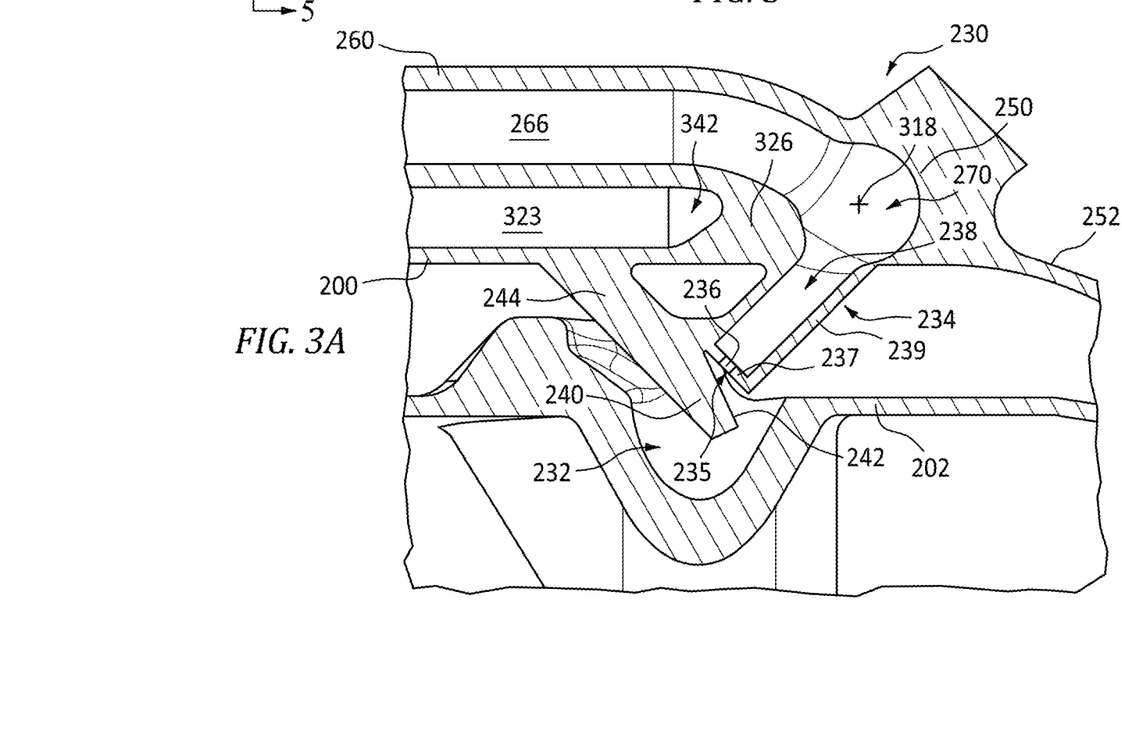
FIG. 3A is a further enlarged view of a fuel injector portion of the engine of FIG. 3.
Figure 6:
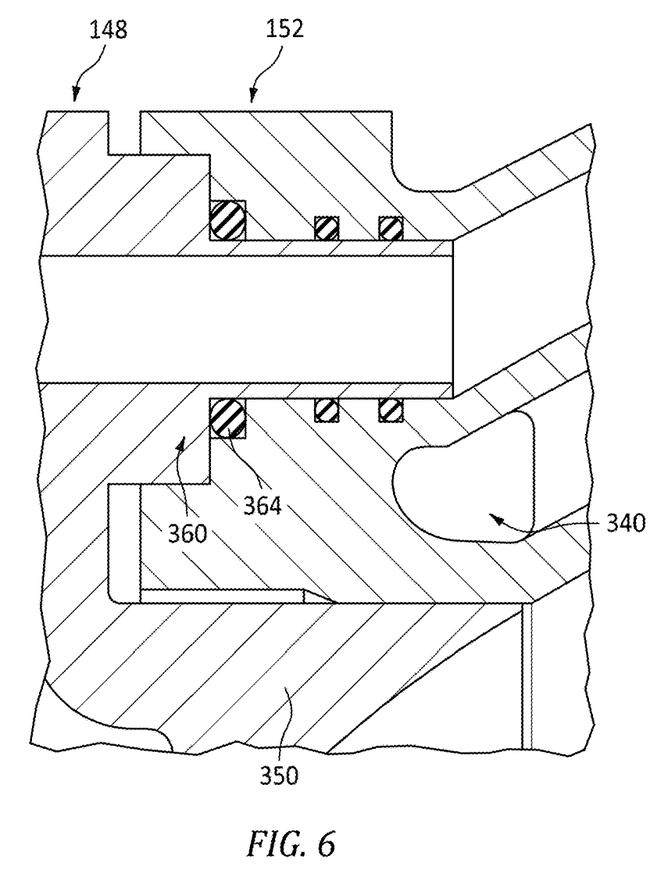
FIG. 6 is a view of an alternate inter-case fuel junction.

FIGS. 3 and 3A show a fuel injector and atomizer unit 230 for introducing fuel to the interior 232 of one of the aft dilution chutes. The unit 230 comprises an injector 234 (FIG. 3B) having an outlet 235 of an orifice 236 in a distal end wall 237 and fed by a passageway 238 within the injector. The injector also has a sidewall 239. Each of the nozzles is fed, in the example system, from an inlet plenum 270 within an inlet manifold 250 (also FIG. 4) fed by a single inlet passageway 266 (FIG. 6) of a single fuel inlet conduit or fuel delivery tube 260 having an inlet 264 (FIG. 3) in the flange 152. The injector 234 extends at least partially across the diffuser plenum 84.

The example fuel plenum 270 is a partial annulus extending less than 360° around the engine. The fuel flow enters from the inlet passageway 266 at one circumferential end of the manifold and plum and may serially flow to the injectors such as passing respectively clockwise (when viewed from the front in the illustrated configuration) ultimately reaching the opposite circumferential end at the final injector.

However, alternative embodiments (not shown) may have a full annulus extending 360° around the engine. The fuel flow entering from the inlet passageway may thus split into two equal branch flows passing respectively clockwise and counterclockwise through adjacent inter-injector segments. Each of these two branch flows feeds a respective subgroup of the injectors with the final injectors along the respective branches being joined by a final two segments. The joining segment may help improve pressure balance between the two branches and provide fueling uniformity.

In an alternative embodiment including less than the full annulus plenum/manifold configuration, conduit 266 may connect at an intermediate location.

Each injector also includes a splash plate 240 (FIG. 3A) having an aft face 242 facing the nozzle outlet 235 and a distal end face of the injector (an outer face of the end wall 237). For structural support of the nozzle and splash plate, the splash plate and nozzle are at the distal end of a radially inward- and axially aft-extending web of ligament 244 extending inward from the diffuser wall 202.

FIG. 3 shows an additive manufacture build direction 590 which may correspond to an ultimate fore-to-aft direction of the engine and parallel to the rotor axis of rotation and which may be an upward vertical direction in the factory frame of reference.

FIG. 3 shows the fuel manifold 250 protruding from an adjacent outer surface 252 of the diffuser outer wall 200. As noted above, the fuel inlet conduit 260 extends aft from a forward inlet 264. In the example, the inlet is integrated with the forward mounting flange 152 (e.g., open to the forward face thereof). The example fuel flowpath may thus pass from the tank 178 to a fuel inlet 171 on the air inlet housing 140 and then branch within the air inlet housing into: (a) one or more branches passing flows for purposes such as bearing cooling; and (b) one or more branches for fueling (e.g., via conduit 182/passageway 180).

The illustrated main case structure 150 embodiment has a single fuel inlet conduit 260. However, for example, in some embodiments (not shown), there may be variations such as two diametrically opposite fueling branches/conduits in the inlet member ultimately passing to two diametrically opposite inlet conduits in the main case structure 150 which may have diametrically opposite junctions with a fuel plenum (e.g. a full annulus) or plenums (e.g., two partial annuli).

Figure 5:
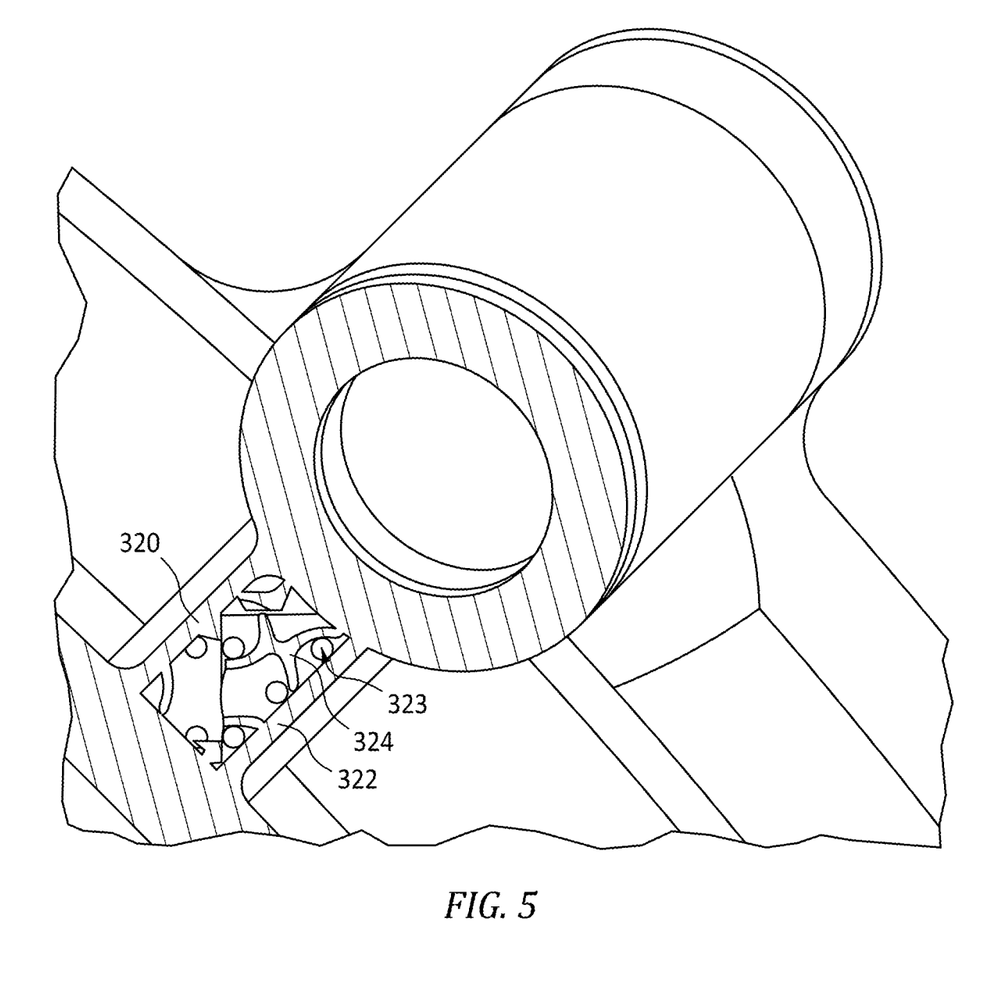
FIG. 5 is a sectional view of a fuel conduit taken along line 5-5 of FIG. 3.

The example fuel inlet conduit 260 is held spaced-apart from the OD surface of the diffuser wall 200 to limit heat transfer. For mechanical strength and limited (but non-zero) heat transfer, this may involve multiple connections of the conduit to diffuser OD wall between the flange 152 forward and the junction with the manifold/plenum aft. The example connection involves the combination of a pair of sidewalls 320, 322 spaced laterally from each other (FIG. 5) and one or more linking structures 324 in the volume 323 between the sidewalls (and optionally connecting with the sidewalls to each other). One example of the linking structure is a regular lattice structure (not shown) joining the diffuser wall OD surface, the sidewalls, and the inlet conduit but having a plurality of gaps formed by the lattice open areas. A similar alternative cellular structure would be a triply periodic minimal surface (TPMS) and/or gyroidal structure. The unfilled portions of the volume 323 thus forming gaps. Additionally, the openings 340 and 342 form axial gaps between the adjacent axial ends of the walls 320, 322 and the flange 152 forward and a connecting web 326 (FIG. 3A) rearward. The axial ends of the walls thus define axially opposite/spaced openings to the external environment.

In the illustrated example, the sidewalls are spaced from the flange and the junction by respective gaps 340, 342. These gaps help allow evacuation of unsintered material from the additive manufacture process. Thus, for example, when manufactured with a vertical upward build direction from fore to aft in the case frame of reference, a subsequent vibration in that orientation will allow unsintered material to pass out the forward (lower) gaps 340 while air enters the aft (upper) gaps 344. This material evacuation may be assisted via compressed air introduction through the aft gaps or suction applied to the forward gaps.

One advantage of this configuration synergistic with the additive manufacture is that it allows easy optimization of heat transfer for different end use variants of a basic engine model. For example, the sidewalls and/or linking structure may be configured to provide greater heat transfer for a variant of an engine intended for startup at high altitude versus a variant optimized for startup at low altitude. In one example of a high heat transfer configuration versus a low heat transfer configuration, the high heat transfer configuration may have higher density and a short thermal conductive path length. For example, there may be fin-like wall structures parallel to the walls 320, 322. In contrast, the low heat transfer configuration may have lower density with longer conductive paths such as the regular lattice. In further examples, a given lattice structure may be used for both high and low heat transfer applications with differences merely in the thickness (e.g., diameter) of the lattice segments.

Among further variations, the cellular structure may vary longitudinally to tune the heat transfer.

In yet further variations (not shown) a cellular structure may be formed in the conduit interior to enhance heat transfer or otherwise affect the fluid flow. For example, it may break up larger bubbles of gas or improve mixing of liquid components.

In the illustrated example, the inlet member mounts to the main case via cooperating flanges. In the example embodiment of FIG. 3B, the AIH has a protruding inner section 350 inboard of the AIH mounting flange 148 received in a forward opening radially inboard of the main case mounting flange 152. This protruding portion thus forms a portion of the gas path from the compressor to the combustor.

Figure 3B:
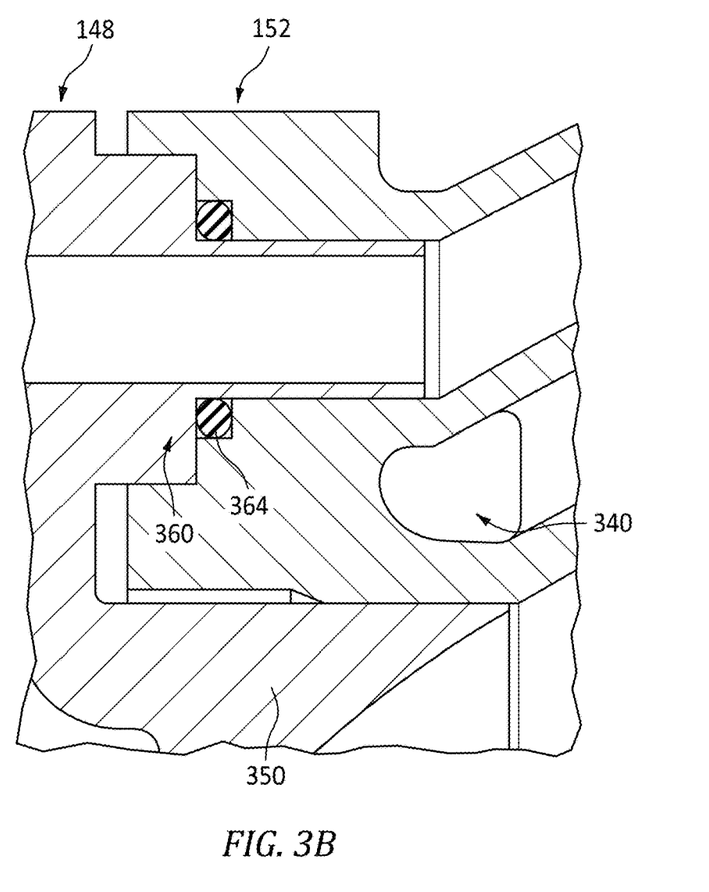
FIG. 3B is a further enlarged view of an inter-case fuel junction of the engine of FIG. 3.
Figure 4:
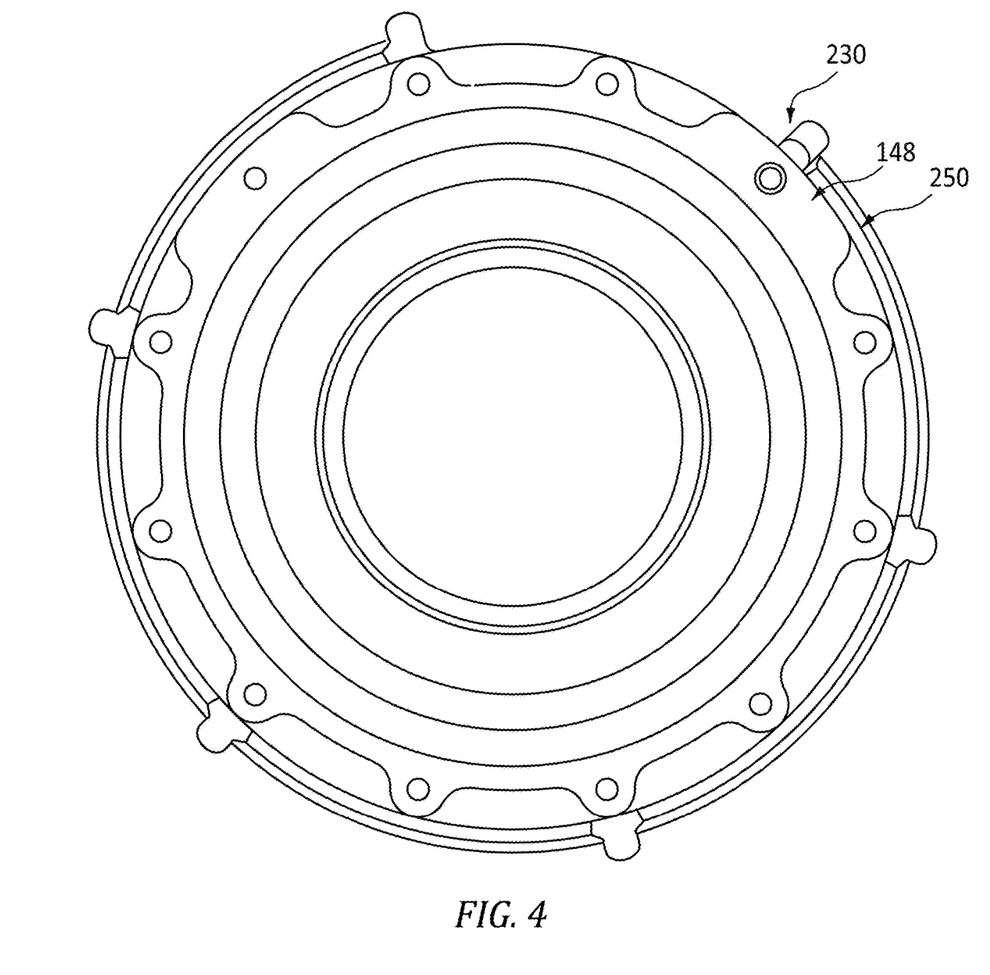
FIG. 4 is a front view of a main case.

For mating the inlet member fuel conduit 182 to the main case fuel inlet conduit 266, the example inlet member includes a rearwardly protruding stepped fuel stub 360 received in a correspondingly stepped compartment/socket 362 in the main case forward mounting flange. One or more seals (e.g., O-rings) 364 may seal between the fuel stub and compartment/socket. In the example implementation, the fuel stub/spigot and compartment/socket replace one associated pair of mounting bolt holes in the circumferential array of bolt holes mounting the two flanges to each other.

Component materials and manufacture techniques and assembly techniques may be otherwise conventional (e.g., unchanged from a baseline engine's).

The modification of the configuration of an otherwise conduitted additively manufactured main case section causes no appreciable increase in cost relative to a baseline because the amount of consolidated material and additive manufacture build time (e.g., in a powder bed fusion-laser beam (PBF-LB) system) is comparable to the baseline.

Although illustrated as a thrust propulsion turbojet such as for a crewed or uncrewed aircraft, details of the fuel conduit and its manufacture may be applied to an engine configured as a turboshaft, a turboprop, an auxiliary power unit (APU), and/or an industrial gas turbine.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A gas turbine engine comprising:
 a gas turbine engine case structure comprising the unitary combination of:
  a case wall having an inner surface and an outer surface;
  at least one fuel inlet;
  a circumferentially-distributed plurality of fuel injectors protruding inward from the case wall and each having a fuel delivery outlet;
  a fuel plenum fluidically between the at least one fuel inlet and the fuel injectors and configured so that each inlet of the at least one inlet is coupled to feed multiple injectors of the plurality of fuel injectors; and a fuel inlet conduit fluidically between the fuel inlet and the fuel plenum;

a rotor having a compressor section and a turbine section;

an air inlet housing mounted to the case structure; and a fuel flowpath passing through the air inlet housing to the at least one fuel inlet, wherein the unitary combination further comprises:

one or more linking structures with gaps and joining the fuel inlet conduit to the case wall.

2. The gas turbine engine of claim 1 wherein:
the fuel plenum is partial annulus.

3. The gas turbine engine of claim 1 wherein:
the at least one inlet is at most two inlets.

4. The gas turbine engine of claim 1 wherein the unitary combination further comprises:
a pair of walls joining the fuel inlet conduit to the case wall, the linking portions between the pair of walls.

5. The gas turbine engine of claim 4 wherein:
a volume between the pair of walls has a first opening and a second opening to an external environment and axially spaced from each other.

6. The gas turbine engine of claim 1 wherein the unitary combination further comprises:
a mounting flange, the fuel inlet conduit extending from the mounting flange to the fuel plenum.

7. The gas turbine engine of claim 1 wherein for each said fuel injector the case structure comprises:
a splash plate having a first face and a second face, the fuel injector outlet facing the second face; and
a support connecting the splash plate to the case wall and the fuel injector.

8. The gas turbine engine of claim 1 wherein there are six to eight said fuel injectors.

9. A method for manufacturing the gas turbine engine of claim 1, the method comprising:
additive manufacture with a build direction (590) within 15° of parallel to an axis of the gas turbine engine case structure.

10. The method of claim 9 further comprising:
vibrating so that powder passes out from the gaps.

11. The method of claim 9 wherein:
the additive manufacture is PBF-LB.

12. A method for using the gas turbine engine of claim 1, the method comprising:
introducing fuel through the inlet;
the fuel passing axially through the inlet conduit to the fuel plenum;
the fuel passing circumferentially through the fuel plenum to the plurality of fuel injectors and out their outlets; and
the fuel mixing with air and combusting.

13. A gas turbine engine case structure comprising the unitary combination of:

a case wall having an inner surface and an outer surface;
a mounting flange;
at least one fuel inlet in the mounting flange;
a circumferentially-distributed plurality of fuel injectors protruding inward from the case wall and having an outlet;
a fuel plenum fluidically between the at least one fuel inlet and the fuel injectors and configured so that each inlet of the at least one inlet is coupled to feed multiple injectors of the plurality of fuel injectors; and
a fuel inlet conduit fluidically between the fuel inlet and the fuel plenum, wherein:
a single additively manufactured piece forms the case wall, the mounting flange, and the fuel inlet conduit and bounds the fuel plenum.

14. The gas turbine engine case structure of claim 13 wherein:
the fuel inlet conduit is spaced apart from the case wall outer surface.

15. The gas turbine engine case structure of claim 13 wherein the unitary combination comprises:
a pair of walls joining the fuel inlet conduit to the case wall.

16. The gas turbine engine case structure of claim 13 wherein:
the fuel plenum is partial annulus.

17. The gas turbine engine case structure of claim 13 wherein:
the at least one inlet is at most two inlets.

18. The gas turbine engine case structure of claim 13 wherein:
the at least one fuel inlet is forward of the fuel plenum.

19. A gas turbine engine case structure comprising the unitary combination of:
a case wall having an inner surface and an outer surface;
at least one fuel inlet;
a circumferentially-distributed plurality of fuel injectors protruding inward from the case wall and each having an outlet;
a fuel plenum fluidically between the at least one fuel inlet and the fuel injectors and configured so that each inlet of the at least one inlet is coupled to feed multiple injectors of the plurality of fuel injectors; and
a fuel inlet conduit fluidically between the fuel inlet and the fuel plenum, wherein:
the unitary combination further comprises a pair of walls joining the fuel inlet conduit to the case wall; and
a volume between the pair of walls has a first opening and a second opening to an external environment and axially spaced from each other.

20. The gas turbine engine case structure of claim 19 wherein:
the at least one fuel inlet is forward of the fuel plenum.

* * * * *